US008390316B2

(12) United States Patent
Boericke, II et al.

(10) Patent No.: US 8,390,316 B2
(45) Date of Patent: Mar. 5, 2013

(54) TERMINATION RESISTOR SCHEME

(75) Inventors: Frederic S. Boericke, II, Mount Vernon, NH (US); Danny J. Fladung, Amherst, NH (US); Stephen G. Boucher, Amherst, NH (US); Eric Kunz, Camas, WA (US)

(73) Assignees: Airmar Technology Corporation, Milford, NH (US); Furuno Electric Company Limited, Hyogo (JP)

( * ) Notice: Subject to any disclaimer, the term of this patent is extended or adjusted under 35 U.S.C. 154(b) by 0 days.

(21) Appl. No.: 12/206,982

(22) Filed: Sep. 9, 2008

(65) Prior Publication Data

US 2010/0060314 A1  Mar. 11, 2010

(51) Int. Cl.
*H03K 17/16* (2006.01)
*H03K 19/003* (2006.01)

(52) U.S. Cl. ............................................. 326/30; 326/86
(58) Field of Classification Search .................... 326/30, 326/86; 702/57, 64–65; 439/34, 620.04
See application file for complete search history.

(56) References Cited

U.S. PATENT DOCUMENTS

| | | | |
|---|---|---|---|
| 5,199,906 A | 4/1993 | Wang | |
| 5,627,481 A * | 5/1997 | Takekuma et al. | 326/30 |
| 5,638,402 A * | 6/1997 | Osaka et al. | 375/257 |
| 5,821,767 A * | 10/1998 | Osaka et al. | 326/30 |
| 5,955,889 A * | 9/1999 | Taguchi et al. | 326/30 |
| 6,026,456 A * | 2/2000 | Ilkbahar | 710/100 |
| 6,249,142 B1 * | 6/2001 | Hall et al. | 326/30 |
| 6,291,770 B1 * | 9/2001 | Casperson | 174/72 A |
| 6,308,232 B1 * | 10/2001 | Gasbarro | 710/100 |
| 6,441,595 B1 | 8/2002 | Pelissier | |
| 6,587,765 B1 * | 7/2003 | Graham et al. | 701/21 |
| 6,828,819 B2 * | 12/2004 | Park et al. | 326/30 |
| 7,068,064 B1 | 6/2006 | Yen | |
| 7,274,583 B2 * | 9/2007 | Park et al. | 365/63 |
| 7,336,098 B2 * | 2/2008 | Wang et al. | 326/40 |
| 2003/0003777 A1 * | 1/2003 | Lesesky et al. | 439/34 |
| 2003/0043683 A1 * | 3/2003 | Funaba et al. | 365/230.03 |
| 2003/0099138 A1 * | 5/2003 | Kyung | 365/200 |
| 2005/0176266 A1 | 8/2005 | Reid | |
| 2006/0236910 A1 * | 10/2006 | Boucher et al. | 114/90 |
| 2007/0103835 A1 * | 5/2007 | Sorenson | 361/114 |
| 2008/0123637 A1 * | 5/2008 | Zolls | 370/362 |

FOREIGN PATENT DOCUMENTS

DE  102 61 386 A1  7/2004

OTHER PUBLICATIONS

European Search Report of EP 09 16 9706 dated Mar. 4, 2010.

\* cited by examiner

*Primary Examiner* — Jason M Crawford
(74) *Attorney, Agent, or Firm* — Hamilton, Brook, Smith & Reynolds, P.C.

(57) ABSTRACT

An example embodiment of the present invention relates to a method and corresponding apparatus that terminates circuit connectivity in a bus by determining location of an instrument on the bus, and based on coupling a terminating resistance to the instrument. The example embodiment may couple a terminating resistance with the instrument placed at the end of a bus by employing at least one male-to-male connector arranged to establish a connection between the female receptacles of the terminating resistance and the bus. In order to determine a state of termination of circuit connectivity in a bus, an example embodiment of the present invention may connect a transceiver to a terminating resistance and determine a state of termination of circuit connectivity in the bus as a function of sensing receive activity in the transceiver.

16 Claims, 7 Drawing Sheets

-- PRIOR ART --

US 8,390,316 B2

TERMINATION RESISTOR SCHEME

BACKGROUND

A communication bus such as the NMEA 2000 bus specified by the National Marine Electronics Association includes a backbone with terminating resistors at each end. Under this configuration, when it is necessary to place an instrument at a distance from other instruments on the bus, a node drop with a terminating resistor needs to be placed at a distant location or the bus needs to be run up and back from the remote location.

SUMMARY

It is desirable to choose to include a terminating resistor depending on the location of an instrument and select whether the terminating resistor is connected.

An example embodiment of the present invention relates to a method and corresponding apparatus that terminates circuit connectivity in a bus by coupling a terminating resistance to an instrument placed at an end of the bus.

Another example embodiment of the present invention relates to a method and corresponding apparatus that terminates circuit connectivity in a bus by determining location of an instrument in the bus, and terminating circuit connectivity in the bus based on the location of the instrument and as a function of coupling a terminating resistance to the instrument.

Yet another example embodiment of the present invention relates to a method and corresponding apparatus that connects a transceiver to a terminating resistance and determines a state of termination of circuit connectivity in a bus as a function of sensing receive activity in the transceiver.

Another example embodiment of the present invention relates to an apparatus that includes a terminating resistance coupled with an instrument placed at the end of a bus, and at least one male-to-male connector arranged to establish a connection between the terminating resistance and the bus to terminate circuit connectivity in the bus.

In the view of the foregoing, the following description illustrates example embodiments and features that may be incorporated into a system for terminating circuit connectivity in a bus and determining the state of circuit connectivity in the bus, where the term "system" may be interpreted as a system, a subsystem, apparatus, method or any combination thereof.

The system may terminate circuit connectivity as a function of establishing a connection between the bus and the terminating resistance. The system may establish the connection between the bus and the terminating resistance using pin connectors. The connection between the bus and the terminating resistance may be established as a function of including at least one male-to-male pin between female receptacles of two otherwise mating connectors.

The system may couple a terminating resistance to the instrument in an event the instrument is located at an end of the bus.

The system may connect a receive output of the transceiver to an interrupt pin of a microprocessor, generate an interrupt as a function of sensing receive activity in the receive output, and determine the termination of circuit connectivity in the bus as a function of the generated interrupt. The system may monitor the interrupt pin to determine the state of termination of circuit connectivity in the bus. The system may disable the interrupt pin in an event termination of circuit connectivity in the bus is determined.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

One example embodiment of the present invention relates to coupling a terminating resistor to a bus when an instrument is located at an end of a bus such as a National Marine Electronics Association (NMEA) 2000 Controller Area Network (CAN) Bus. NMEA 2000 is a combined electrical and data specification for a marine data network for communication between marine electronic devices such as depth finders, sensors and other instruments.

Another example embodiment of the present invention relates to determining whether or not the terminating resistor has been coupled to the bus.

Figure 1:
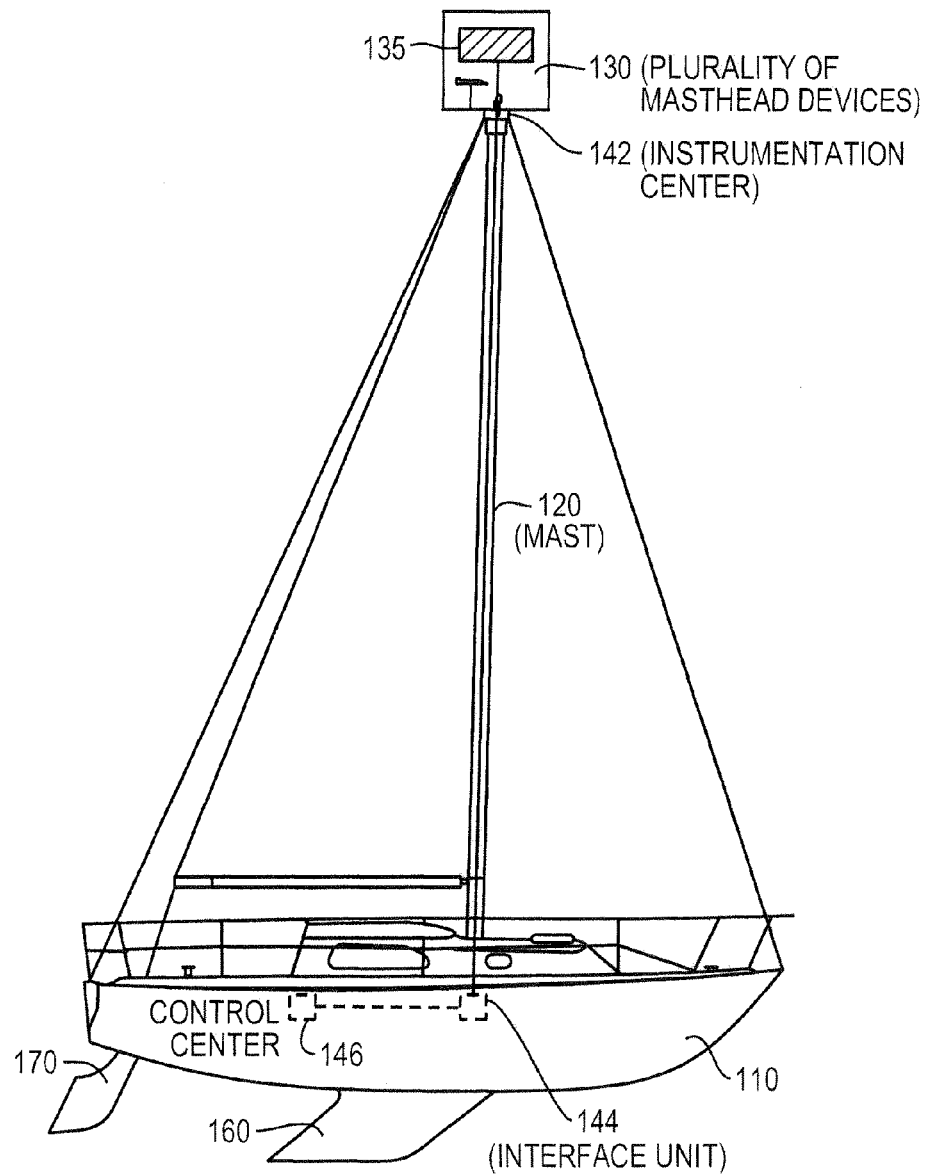
FIG. 1 is an illustration of a perspective view of a sailboat.

FIG. 1 illustrates a perspective view of a sail vessel 100 (illustrated in U.S. Patent Application Publication 2006/0236910, the teachings of which are incorporated by reference in its entirety). The sail vessel 100 may include a hull 110, a mast 120, a centerboard or keel 160, and a rudder 170. Typically, the hull 110, the mast 120, and the keel 160 are designed to ensure the static and dynamic stability of the sailing vessel 100. The sail vessel 100 may also include a control system. The control system may include an interface unit 144, and a control center 146, and an instrumentation center 142. The interface unit 144 and the control center 146 may be located on board of the sail vessel 100 and provide a means for communicating with the instrumentation center 142. The instrumentation center 142 is located atop the mast 120 and provides a means for mounting a plurality of masthead devices 130.

The instrumentation center 142 may include masthead devices such as an antenna, a running light, an anchor light, or a weather device such as an Airmar WeatherStation instrument. A bus cable 150, such as a coaxial cable, running up the mast 120, may connect the instrumentation center 142 to the interface center 144. The bus cable 150 may include a bus interface for terminating circuit connectivity according to an example embodiment of the present invention.

In one example embodiment, the bus cable 150 may run up the mast 120, in which case a backbone exists at the top of the mast for connecting the masthead devices. In another example embodiment, instruments such as radar may communicate with the masthead devices via ethernet and may include features for terminating circuit connectivity according to an example embodiment of the present invention. In yet another embodiment, an Airmar WeatherStation instrument may be connected via a backbone to the radar, and instruments placed at each end of the backbone may include features for terminating circuit connectivity according to an example embodiment of the present invention.

Figure 2:
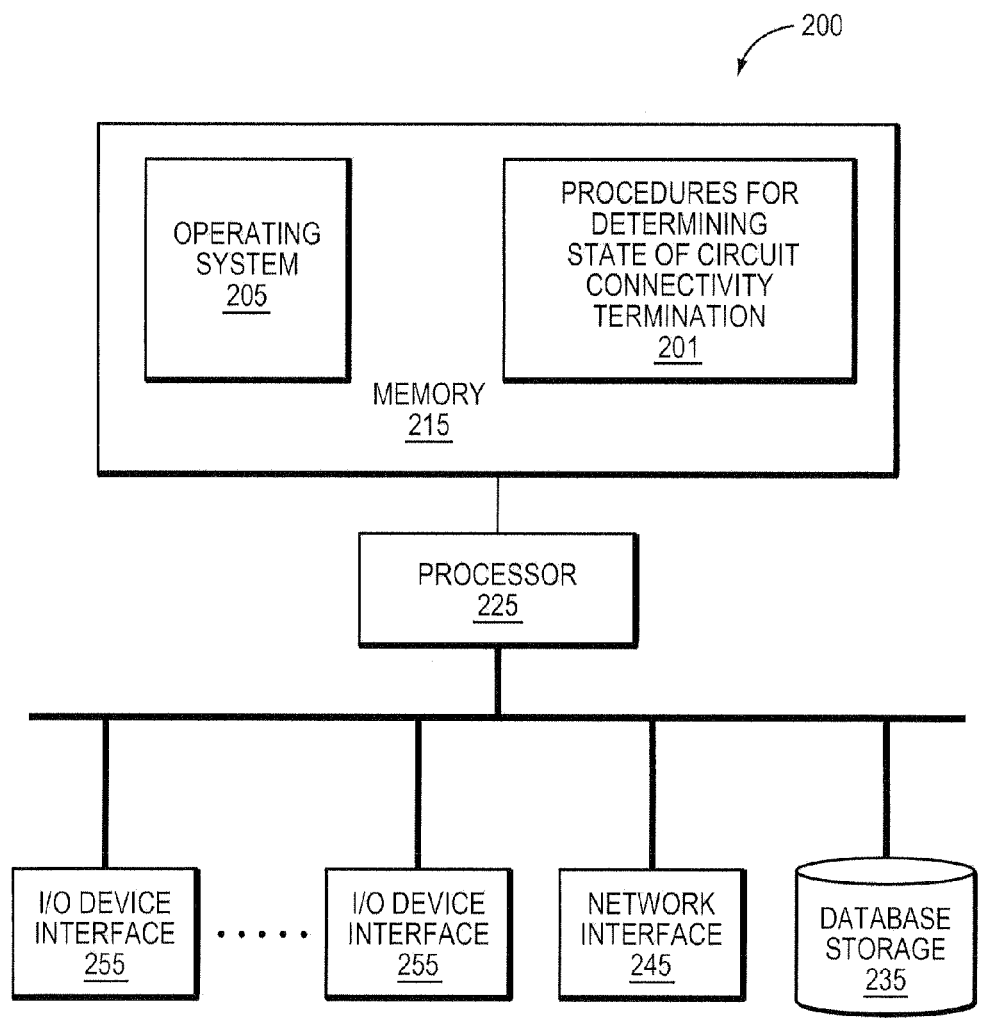
FIG. 2 is an example illustration of a management unit that may be used with the techniques described herein.

FIG. 2 is an example illustration of a management unit 200 that may be used with the techniques described herein. The components of the management unit 200 may be fully or partially placed in the instrumentation center 142, on top the mast 120, as a part of the plurality of mast head devices 130, in the control center 146, or in the interface unit 144.

The management unit 200 may include a memory unit 215 along with a processor 205 that may be connected to various interfaces via an input/output (I/O) device interface 255. The memory unit 215 may be a computer-readable memory and include combinations of non-volatile memory devices. The memory unit 215 is configured to hold various computer-executable instructions and data structures including computer-executable instructions and data structures that implement aspects of the techniques described herein.

Figure 4:
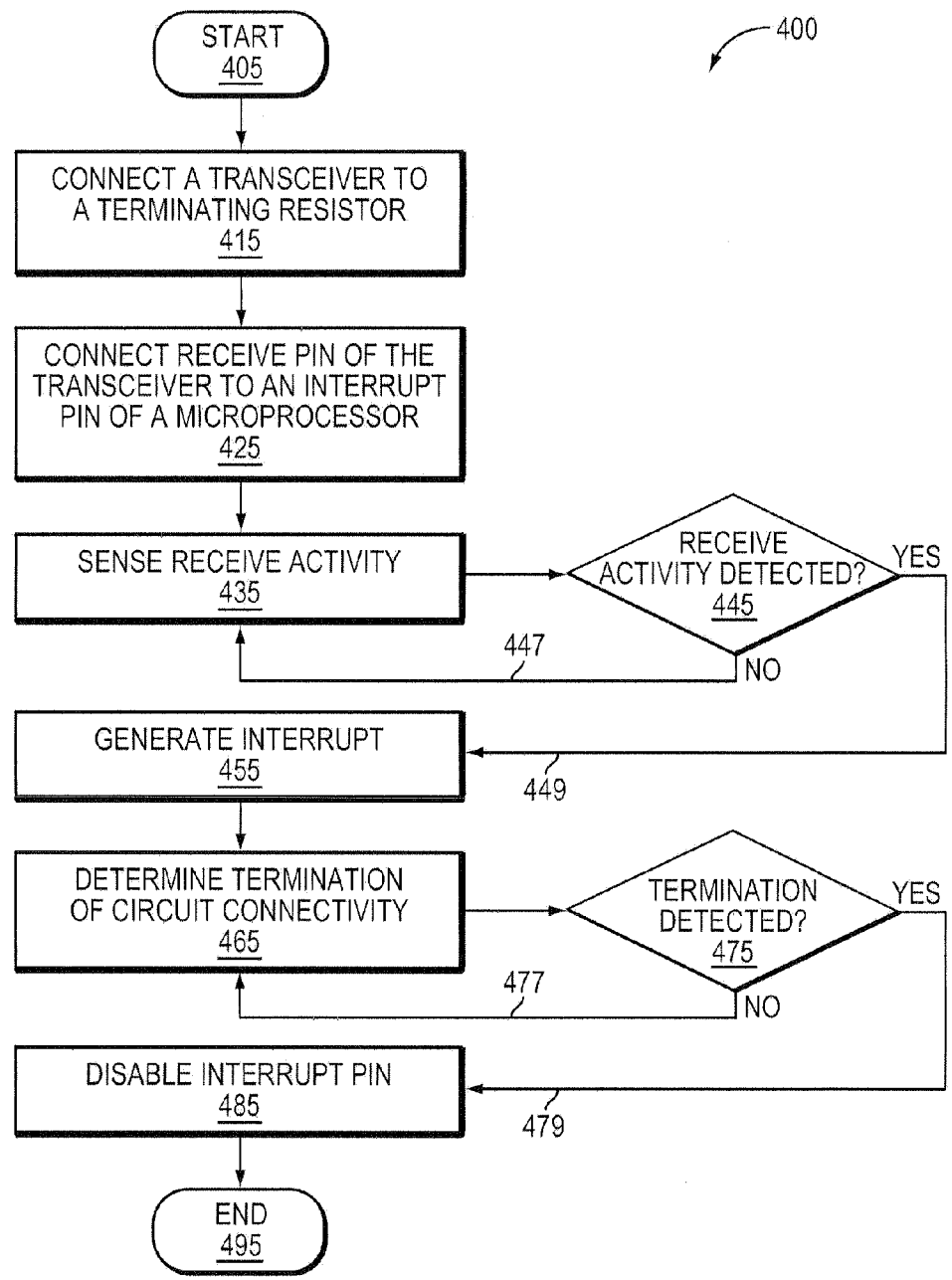
FIG. 4 is a flow diagram of procedures for an example embodiment for determining state of termination of circuit connectivity in a bus.

The memory unit 215 may include a unit for procedures involved in determining state of circuit connectivity termination 201 according to an example embodiment of the present invention (illustrated in detail in FIG. 4).

The memory unit 215 may also include an operating system 205 and be arranged to implement various conventional operating system functions including task and process scheduling, memory management, and controlled access to various devices, such as a database storage unit 235. The processes may include computer-executable instructions and data that are configured to implement various aspects of the techniques described herein.

The management unit 200 may also include a network interface 245 to connect the system to a network. The processor 205 may include a conventional central processing unit (CPU) comprising processing circuitry that is configured to execute various instructions and manipulate data structures from the memory unit 215.

The I/O device interfaces 255 may include logic to interface with various input and/or output devices, such as a keypad or mouse and with the processor 225. The I/O device interfaces 255 may be configured to allow signals to be transferred between the management unit 200 and other components of the system.

Figure 3:
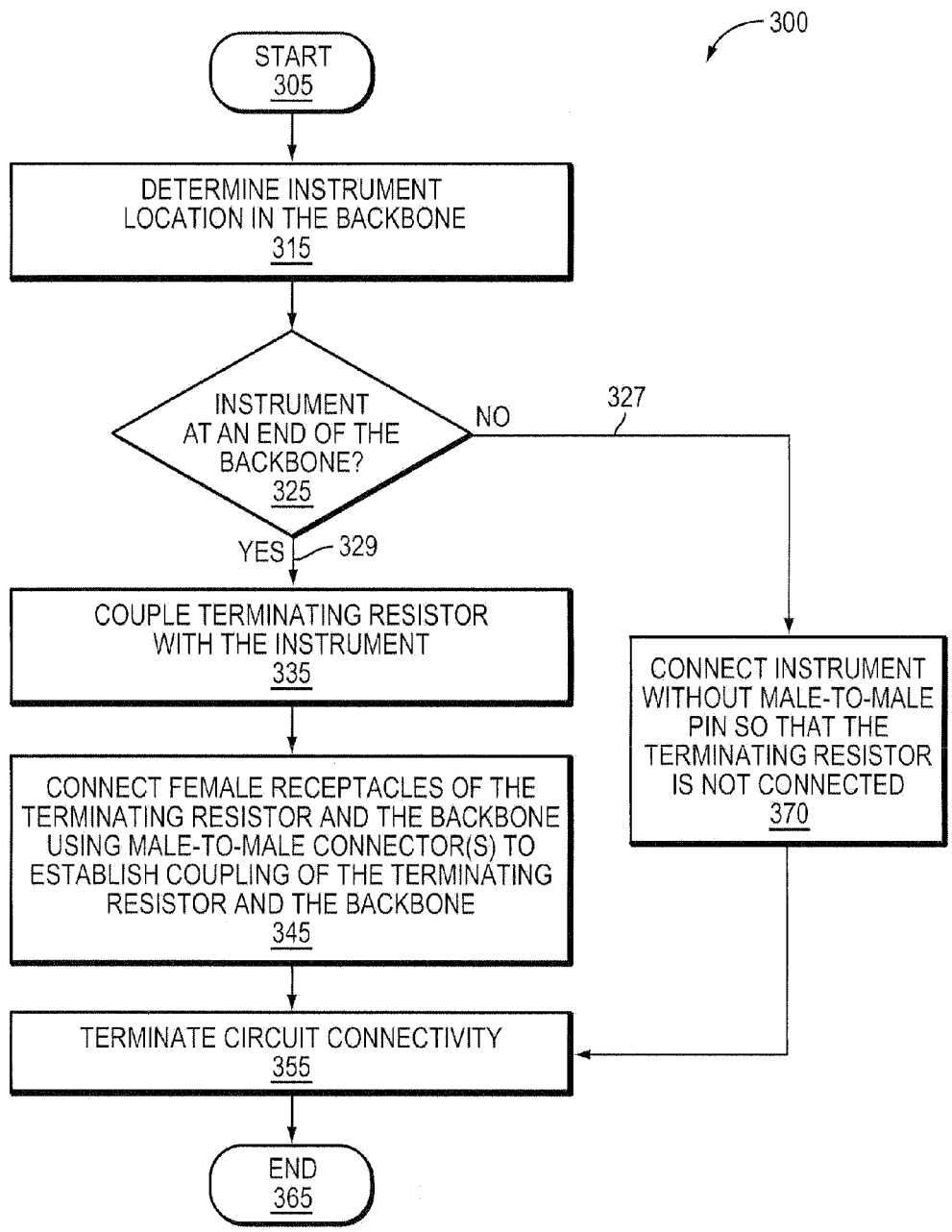
FIG. 3 is a flow diagram of procedures for an example embodiment for terminating circuit connectivity in a bus.

FIG. 3 is a flow diagram of a process 300 for an example embodiment for terminating circuit connectivity in a bus. The process 300 starts 305 with determining the location of an instrument in the bus at 315. The process determines if the instrument is placed at the end of the bus at 325. If it is determined that the instrument is placed at the end of the bus at 329, a terminating resistor is coupled with the instrument at 335. In order to couple the terminating resistor with the instrument, the example embodiment connects female receptacles of the terminating resistor and the bus using at least one male-to-male connector at 345. Once the instrument and the bus are coupled, with or without the terminating resistor, the circuit connectivity is terminated at 355. If the instrument is not placed at the end of the bus at 327, the instrument is connected without a male-to-male pin 370 so that the terminator resistor is not connected and circuit connectivity is terminated 355.

FIG. 4 is a flow diagram of a process 400 for an example embodiment for determining state of termination of circuit connectivity in a bus. The process 400 starts by connecting a transceiver to a terminating resistor at 415. The process 400 also connects a receive pin of the transceiver to an interrupt pin of a microprocessor at 425. The process 400 checks to determine if the receive pin of the transceiver senses receive activity at 435. Upon checking for detection of receive activity at 445, if receive activity is not detected at 447, the process continues to check to see if the receive pin of the transceiver senses receive activity 435. If receive activity is detected at 449 the process 400 generates an interrupt at 455. Based on the generated interrupt, the example embodiment determines termination of circuit connectivity at 465. If termination of circuit connectivity is not determined at 477, the process 400 continues to determine termination of circuit connectivity at 465. If termination of circuit connectivity is determined at 479, the process 400 disables the interrupt pin of the microprocessor at 485, indicating that termination of circuit connectivity has been achieved.

Figure 5:
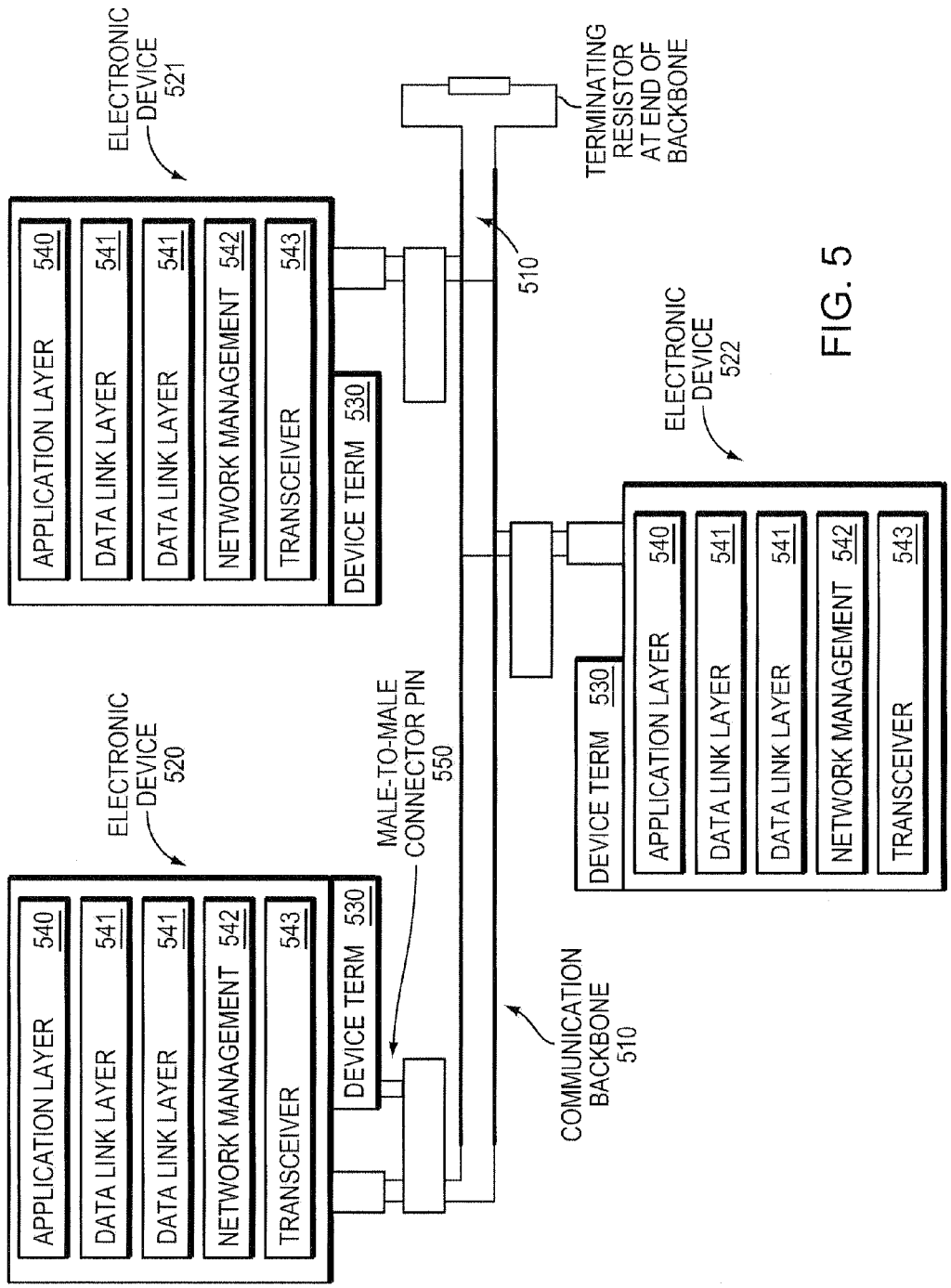
FIG. 5 is an example illustration of a bus that terminates circuit connectivity.

FIG. 5 is an example embodiment 500 of a configuration that terminates circuit connectivity. The bus 510 may be a part of a normal configuration of a National Marine Electronics Association (NMEA) configuration such as the NMEA 2000. The normal Configuration of the NMEA 2000 Bus includes a backbone that is designed to have terminating resistors at each end. Under the normal configuration, all the devices on the bus are connected to drops between the two ends of the bus 510. The devices on the network 520, 521, 522 may include elements such as an application layer 540, data link layer 541, network management 542, and a transceiver 543. However, when a device 520 on the network needs to be located at a distance from other devices on the network, an example embodiment of the present invention is arranged to attach the device 520 to the end of the bus 510 and couple the terminating resistor 530 to the device 520. By coupling the terminating resistor 530 with the device 520, the example embodiment 500 avoids the need for placing a node drop with terminating resistor at the distant location, or, worse yet, running the bus up and back from the remote location.

Another example embodiment 500 may include a short bus, with an instrument on each end, each with a built in terminating resistor.

The example embodiment 500 determines if the device 520 is located at the end of the bus 510. If the device 520 is located at the end of the bus 510, the example embodiment 500 couples a terminating resistor to the device 520.

In order to couple the terminating resistor with the instrument, the example embodiment connects female receptacles of the terminating resistor and the bus interface for the terminating resistor using at least one male-to-male connector 550. Once the terminating resistor 530 and the bus interface 535 for the terminating resistor are coupled, the circuit connectivity is terminated.

Figure 6:
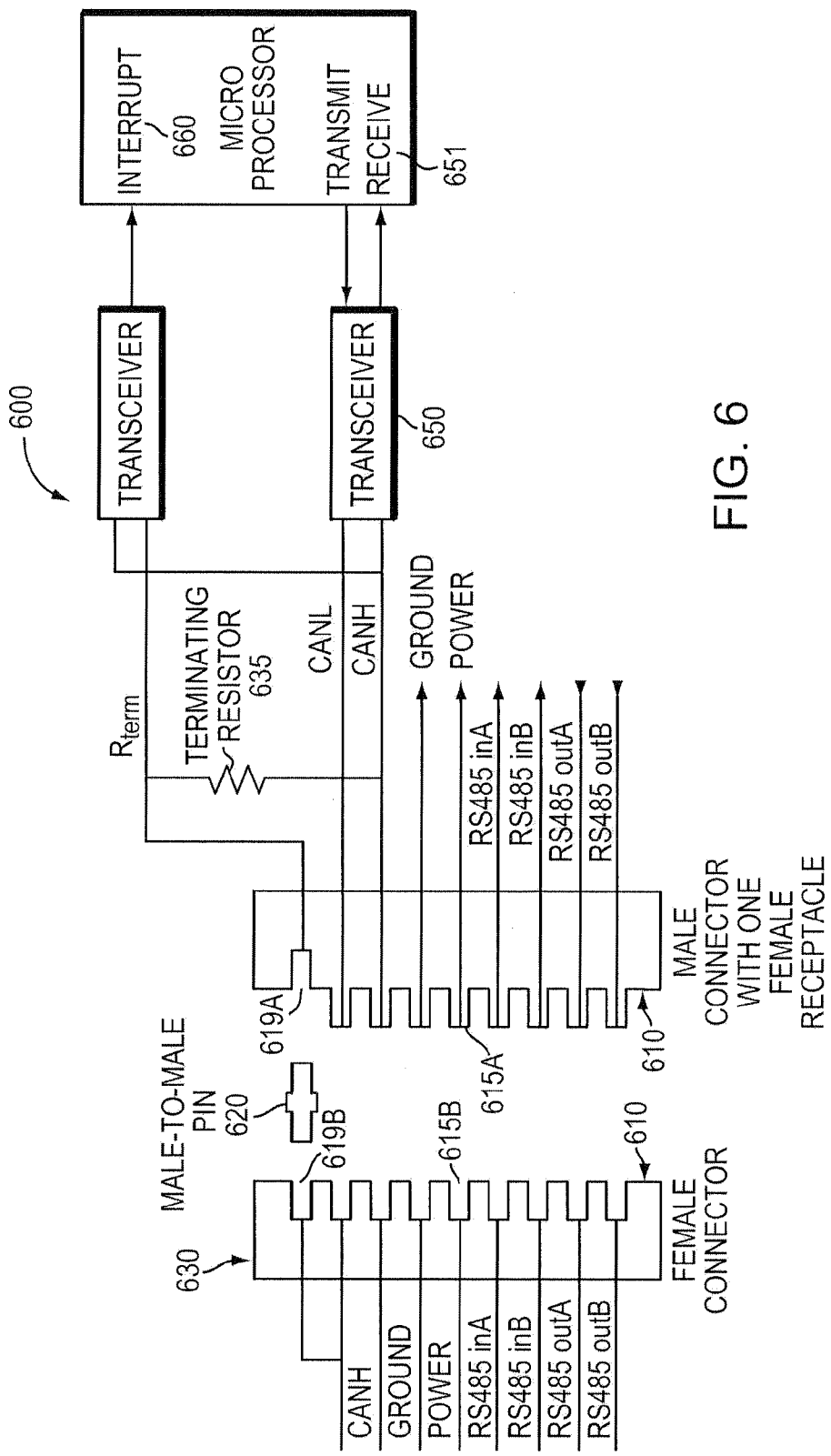
FIG. 6 is an example illustration of a connection established between a bus and a terminating resistance.

FIG. 6 is an example illustration 600 of a connection established between a bus and a terminating resistance. The example embodiment 600 of the present invention may accomplish the coupling of the terminating resistor 635 and the bus interface 630 using a nine pin connector 610. In one example embodiment, for eight of the pins, the instrument has male pins, and the bus connector 630 has female receptacles. The ninth pin 619A, 619B has female receptacles in both connectors. Thus, normally, there would be no connection between the two connectors. This would disconnect one end of the terminating resistor 635. To connect the terminating resistor, a male-to-male pin 620 is inserted in between the two connectors 619A, 619B, such that when they are mated, pin 5 of the instrument is connected to pin 5 615A, 615B of the bus connector 630. Pin 5 of the bus connector 630 is shorted to the other side of the bus, thus connecting the terminating resistor 635 across the bus.

In order to determine state of circuit connectivity termination, the example embodiment 600 may connect a Controller Area Network (CAN) transceiver 650 across the terminating resistor 635. The receive pin 651 of the CAN transceiver 650 only receives activity if the resistor 635 and the bus connector 630 are coupled.

The input of the transceiver 650 is connected to a voltage that can put the device in a very low power receive only mode, thereby saving power. The receive output 651 of the transceiver 650 is connected to an interrupt pin 660 on the microprocessor. Interrupts are only generated if the terminating resistor 635 is connected. The example embodiment 600 monitors this pin 660 initially, and disables interrupts once it has been determined whether the terminating resistor 635 is coupled to the bus 630 or not.

If an interrupt is generated, based on the generated interrupt, the example embodiment 600 determines termination of circuit connectivity. If termination of circuit connectivity is not determined, the example embodiment 600 continues to determine termination of circuit connectivity. If termination of circuit connectivity is determined, the example embodiment 600 disables the interrupt pin 660 of the microprocessor, indicating that termination of circuit connectivity has been achieved.

Figure 7:
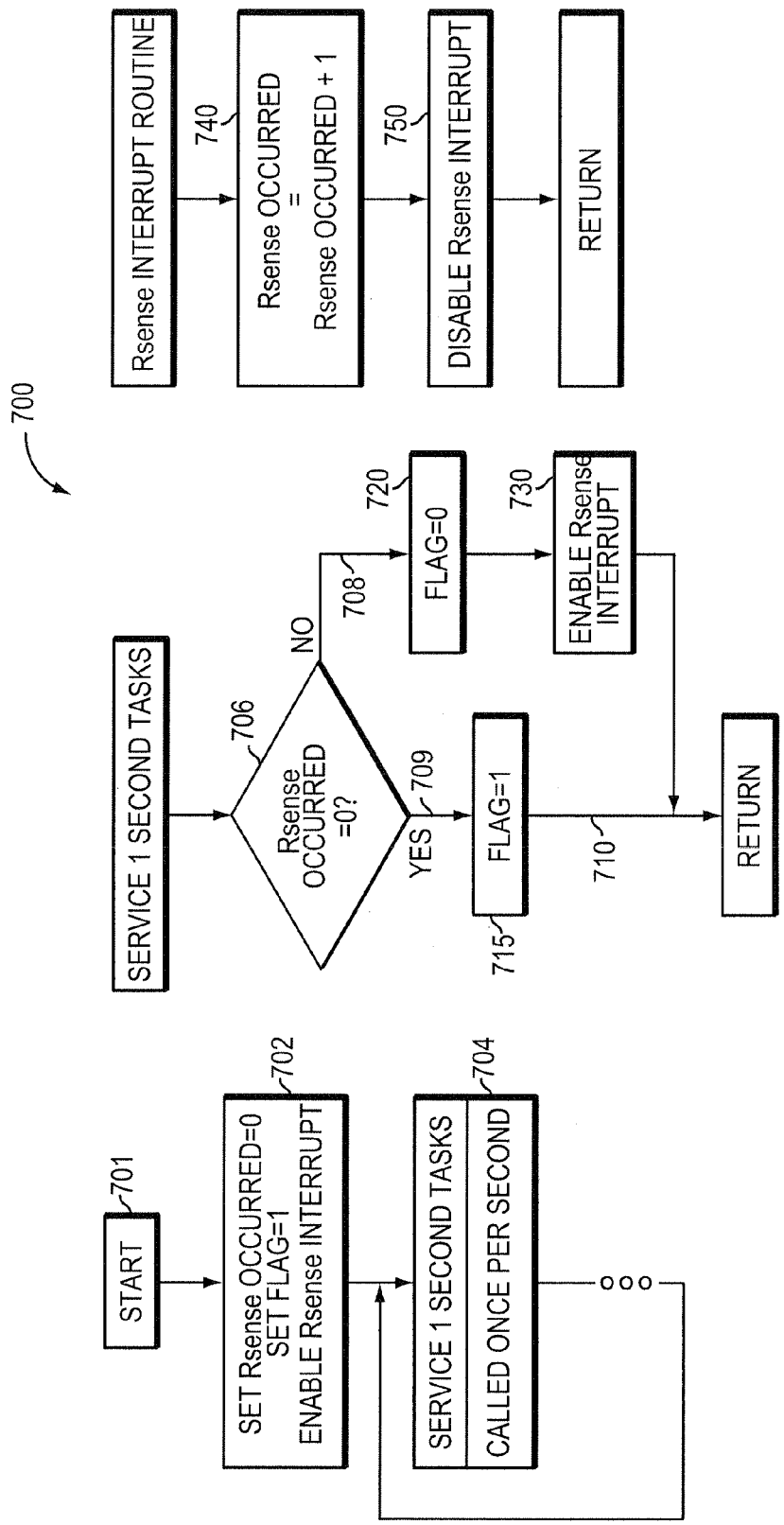
FIG. 7 is an example embodiment of the procedures involved in determining state of circuit connectivity termination.

FIGS. 7 illustrates the procedures involved in determining state of circuit connectivity termination according to an example embodiment of the present invention 700. The example embodiment 700 starts 701 by initializing a variable RsenseOccurred to zero 702 and setting an indicator flag on (i.e., Flag=1) as well as a interrupt indicator variable Rsense Interrupt (Rsense Interrupt=1). By setting the variable RsenseOccurred to zero and turning on the indicator flag, the example embodiment indicates that the presence of a terminator resistor has not yet been detected. Similarly, when the value of RsenseOccurred is set to one and the indicator flag is set to zero, the example embodiment indicates that the presence of a terminator resistor has been detected.

The example embodiment 700 is arranged to verify 706 the status of the variable RsenseOccurred on a one second long interval basis 704. If the value of RsenseOccurred is zero 709, the indicator flag remains on 715 (i.e., Flag=1), indicating that a terminating resistor has not been detected. If the value of RsenseOccurred is greater than zero 708, the example embodiment resets the value of the indicator flag to zero 720 (i.e., turns the indicator flag off) and re-enables Rsense Interrupt 730.

When an interrupt occurs 730, the example embodiment 700 increments the value of RsenseOccurred by one 740 and disables interrupt by disabling Rsence Interrupt 750.

While this invention has been particularly shown and described with references to example embodiments thereof, it will be understood by those skilled in the art that various changes in form and details may be made therein without departing from the scope of the invention encompassed by the appended claims.

What is claimed is:
1. A method comprising:
   physically coupling a terminating resistance to an instrument placed on a bus, the instrument being connected to the bus through a bus interface; and
   terminating circuit connectivity in the bus by establishing an electrical connection through at least one male-to-male pin insertable between the terminating resistance and the bus interface of the instrument.
2. The method of claim 1 further comprising inserting the at least one male-to-male pin between female receptacles of two otherwise mating connectors.
3. The method of claim 1 wherein the instrument is a radar or weather device.
4. A method for terminating circuit connectivity in a bus comprising:
   determining a location of an instrument on the bus, the instrument being physically coupled with a terminating resistance; and
   terminating circuit connectivity in the bus based on the location of the instrument and by establishing an electrical connection through at least one male-to-male pin insertable between the bus and the terminating resistance.
5. The method of claim 4 further comprising coupling the terminating resistance to the instrument in an event the instrument is located at an end of the bus.
6. The method of claim 4 further comprising establishing the electrical connection between the bus and the terminating resistance using pin connectors.
7. The method of claim 4 further comprising establishing the electrical connection between the bus and the terminating resistance as a function of coupling at least one male-to-male connector between female receptacles of two otherwise mating connectors.
8. A method comprising:
   connecting a transceiver to a terminating resistance, the terminating resistance terminating circuit connectivity in a bus upon establishing an electrical connection to the bus; and
   determining an achieved state of termination of circuit connectivity in the bus as a function of sensing receive activity in the transceiver.
9. The method of claim 8 including connecting a receive output of the transceiver to an interrupt pin of a microprocessor, generating an interrupt as a function of sensing receive activity in the receive output, and further determining the achieved state of termination of circuit connectivity in the bus as a function of the generated interrupt.
10. The method of claim 9 further including monitoring the interrupt pin to determine the achieved state of termination of circuit connectivity in the bus.
11. The method of claim 9 further including disabling the interrupt pin in an event the achieved state of termination of circuit connectivity in the bus is determined.
12. An apparatus comprising:
   a terminating resistance physically coupled with an instrument placed at an end of a bus;
   at least one male connector comprising a female receptacle coupled to the terminating resistance; and
   at least one male-to-male insertable pin being arranged between the at least one female receptacle and a connector of the bus to establish an electrical connection between the terminating resistance and the bus to terminate circuit connectivity in the bus.
13. The apparatus of claim 12 further comprising a transceiver connected to the terminating resistance, the transceiver arranged to sense receive activity to determine a state of termination of circuit connectivity.
14. The apparatus of claim 13 wherein a receive output of the transceiver is arranged to connect to an interrupt pin of a microprocessor, the interrupt pin being arranged to generate an interrupt to indicate termination of circuit connectivity in the bus in an event receive activity is sensed in the transceiver.

15. The apparatus of claim 14 further including a monitoring module to monitor the interrupt pin to determine the state of termination of circuit connectivity in the bus.

16. The apparatus of claim 14 further including a module arranged to disable the interrupt pin in an event termination of circuit connectivity in the bus is determined.

* * * * *